(12) United States Patent
Liu et al.

(10) Patent No.: US 10,823,663 B2
(45) Date of Patent: Nov. 3, 2020

(54) MEASUREMENT DEVICE AND MEASUREMENT METHOD FOR THIN FILM PROVIDED WITH TRANSPARENT SUBSTRATE

(71) Applicant: SHANGHAI MICRO ELECTRONICS EQUIPMENT (GROUP) CO., LTD., Shanghai (CN)

(72) Inventors: Hao Liu, Shanghai (CN); Yuying Zhou, Shanghai (CN)

(73) Assignee: SHANGHAI MICRO ELECTRONICS EQUIPMENT (GROUP) CO., LTD., Shanghai (CN)

(*) Notice: Subject to any disclaimer, the term of this patent is extended or adjusted under 35 U.S.C. 154(b) by 225 days.

(21) Appl. No.: 15/576,654

(22) PCT Filed: May 20, 2016

(86) PCT No.: PCT/CN2016/082867
§ 371 (c)(1),
(2) Date: Nov. 22, 2017

(87) PCT Pub. No.: WO2016/188378
PCT Pub. Date: Dec. 1, 2016

(65) Prior Publication Data
US 2018/0120220 A1    May 3, 2018

(30) Foreign Application Priority Data

May 24, 2015 (CN) .......................... 2015 1 0270033

(51) Int. Cl.
*G01N 21/21*    (2006.01)
*G01N 21/84*    (2006.01)
(Continued)

(52) U.S. Cl.
CPC ........ *G01N 21/211* (2013.01); *G01B 11/0625* (2013.01); *G01B 11/0675* (2013.01);
(Continued)

(58) Field of Classification Search
CPC ...... G01N 21/211; G01N 21/45; G01N 21/21; G01N 21/8422; G01N 2201/0642;
(Continued)

(56) References Cited

U.S. PATENT DOCUMENTS 5,159,412 A * 10/1992 Willenborg ........ G01B 11/0616
250/559.07
5,497,234 A *  3/1996 Haga .................. G01N 21/8806
356/237.5

(Continued)

FOREIGN PATENT DOCUMENTS

CN    102519976 A    6/2012
CN    102679907 A    9/2012
(Continued)

OTHER PUBLICATIONS

English Machine Translation of Cn 104677299 (Year: 2015).*

*Primary Examiner* — Dominic J Bologna
(74) *Attorney, Agent, or Firm* — Muncy, Geissler, Olds & Lowe, P.C.

(57) ABSTRACT

A measurement device for measuring a thin film on a transparent substrate is disclosed which includes, disposed sequentially along the direction of light propagation, a light source (1), a collimator lens (2), a filter (3), a polarizer (4), a beam splitter (5) and an objective lens (7). To the beam splitter (5) are connected a planar array detector (11) and a processor (13). Light emitted by the light source (1) sequentially passes through the collimator lens (2), the filter (3), the polarizer (4), the beam splitter (5) and the objective lens (7) and thereby forms a measuring light incident on the thin (Continued)

film. The objective lens (7) and the beam splitter (5) gather light reflected from the thin film, and the planar array detector (11) and the processor (13) measure physical parameters of the thin film based on the gathered reflected light. The device further includes a stop configured to block interfering light reflected from the transparent substrate during the measurement.

17 Claims, 4 Drawing Sheets

(51) Int. Cl.
*G01B 11/06* (2006.01)
*G01N 21/45* (2006.01)
(52) U.S. Cl.
CPC .............. *G01N 21/21* (2013.01); *G01N 21/45* (2013.01); *G01N 21/8422* (2013.01); *G01B 2290/70* (2013.01); *G01N 2201/068* (2013.01); *G01N 2201/0633* (2013.01); *G01N 2201/0642* (2013.01)
(58) Field of Classification Search
CPC ..... G01N 2201/068; G01N 2201/0633; G01N 21/958; G01N 21/8806; G01B 11/0625; G01B 11/0675; G01B 2290/70
See application file for complete search history.

(56) References Cited

U.S. PATENT DOCUMENTS

| | | |
|---|---|---|
| 5,780,857 A | 7/1998 | Harju et al. |
| 5,883,748 A | 3/1999 | Shum et al. |
| 6,370,422 B1 | 4/2002 | Richards-Kortum et al. |
| 6,798,511 B1 * | 9/2004 | Zhan .................. G01J 4/00 356/369 |
| 7,545,510 B2 | 6/2009 | Lee et al. |
| 8,908,175 B1 | 12/2014 | Kandel et al. |
| 2002/0111546 A1 | 8/2002 | Cook et al. |
| 2003/0057972 A1 * | 3/2003 | Pfaff .................. G01R 15/241 324/754.23 |
| 2004/0080757 A1 * | 4/2004 | Stanke .................. B24B 37/34 356/601 |
| 2005/0057747 A1 | 3/2005 | Meeks |
| 2006/0072126 A1 | 4/2006 | Meeks |
| 2007/0046953 A1 * | 3/2007 | De Groot ........... G01B 11/0675 356/512 |
| 2007/0091317 A1 * | 4/2007 | Freischlad ......... G01B 9/02072 356/511 |
| 2007/0121106 A1 * | 5/2007 | Shibata ............... G01N 21/9501 356/237.2 |
| 2007/0247616 A1 | 10/2007 | Hamamatsu et al. |
| 2013/0286400 A1 * | 10/2013 | Kim ........................ G01B 9/04 356/450 |
| 2013/0341310 A1 * | 12/2013 | Van Der Wilt ......... C30B 13/24 219/121.62 |
| 2014/0218724 A1 * | 8/2014 | Meeks ............... G01N 21/9501 356/237.4 |
| 2015/0109623 A1 * | 4/2015 | Abdulhalm ......... G01B 9/02011 356/479 |
| 2015/0247808 A1 * | 9/2015 | Van Der Wilt ........... C30B 1/02 356/237.5 |
| 2017/0351184 A1 * | 12/2017 | Peng .................. G03F 7/70633 |

FOREIGN PATENT DOCUMENTS

| | | |
|---|---|---|
| CN | 103226001 A | 7/2013 |
| CN | 204008436 U | 12/2014 |
| CN | 104677299 A | 6/2015 |
| JP | S61247944 A | 11/1986 |
| JP | H05340869 A | 12/1993 |
| JP | 2000065536 A | 3/2000 |
| JP | 2014035256 A | 2/2014 |
| TW | 201113514 A | 4/2011 |
| TW | 201418694 A | 5/2014 |

* cited by examiner

Fig. 1

Prior Art

MEASUREMENT DEVICE AND MEASUREMENT METHOD FOR THIN FILM PROVIDED WITH TRANSPARENT SUBSTRATE

TECHNICAL FIELD

The present invention relates to thin film measuring devices and methods for use thereof and, in particular, to a device for measuring a thin film on a transparent substrate and methods for use of such a device.

BACKGROUND

Thin films are thin, soft, transparent sheets made of plastics, adhesives, rubbers or other materials. They have been extensively used in electronic appliances, machinery, packaging, printing and other application. Thin films may suffer from impaired quality due to some issues arising from their practical manufacturing, such as insufficient cleanliness of a cleanroom and a defective roller in the production line. If such issues are not identified and addressed in a timely way, apart from the inferior quality of the manufactured films, they may also lead to losses to the industries where the films are used. In China, with the competition in the thin film market getting increasingly fierce, more and more stringent requirements are imposed on the quality of thin films. The traditional human eye inspection has lagged far behind the extremely high requirements of the current high-speed production processes. In this context, in order to meet the needs for industrial development, machine vision inspection tends to be an alternative solution for detecting thin film surface flaws.

Figure 1:
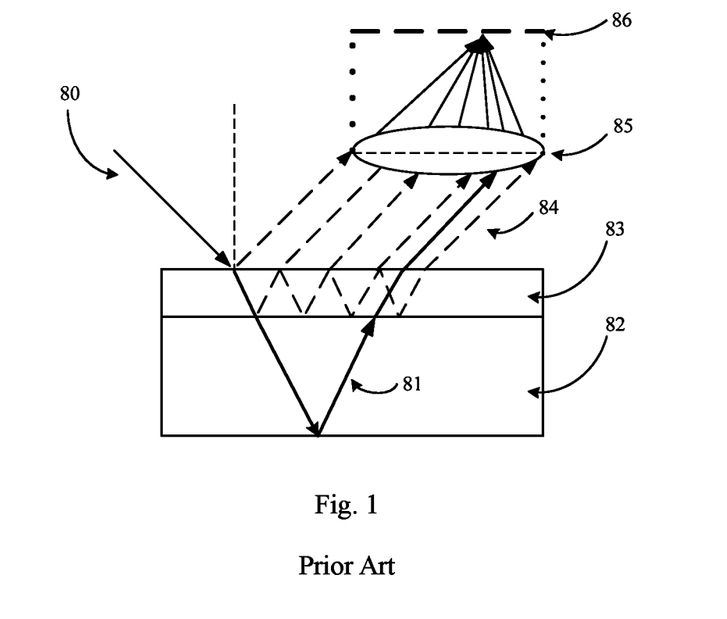
FIG. 1 shows reflection of light by a transparent substrate and a transparent thin film in accordance with the prior art.

Conventionally, techniques for the inspection of thin films on opaque substrates have been established, in which reflectometers or ellipsometers are usually used. However, such conventional techniques are not suitable for use in the inspection of thin films on transparent substrates. In the prior art, there has been disclosed a thin film inspection device including, disposed sequentially in an optical path, a light source, an optical element, a beam splitter, an objective lens, an object to be measured and a stage for carrying the object. To the beam splitter are sequentially connected an optical receiving element and a visual detector, and a processor is provided in connection with the visual detector and the optical element. This device employs an angular spectrum method, in which the light source provides planar incident light with an angle of incidence varying in the range of 360°. The optical element includes a two-dimensional CCD array for measuring the reflected light intensity and feeding measured data to the processor, based on which, the processor calculates inspection results of the object. However, in case of the object on a transparent substrate, the transparent substrate will inevitably pose an impact on the reflected light and affect the inspection results. As shown in FIG. 1, along with reflected light 84 from the transparent thin film 83, reflected light 81 from the transparent substrate 82 enters the objective lens 85 and is refracted by the objective lens 85 to a back focal plane 86 of the objective lens. If the reflected light 81 from the transparent substrate 82 is not removed prior to the subsequent image and data transfer, it can make the inspection of the transparent thin film 83 inaccurate. Therefore, this device is incapable of measuring a thickness of the thin film on the transparent substrate.

In another solution disclosed in the prior art, illumination light is incident at a small angle to reduce interfering light reflected from the transparent substrate. Still another conventional solution utilizes obliquely incident illumination light and an angular spectrum method, in which reflectance for light of a single wavelength is measured at various angles of incidence and azimuths. The measurements are averaged to obtain desired parameters of the thin film. However, none of these solutions are completely immune from interference from the light reflected from the transparent substrate. Hence, they cannot yield accurate results.

Therefore, how to accurately measure a thickness and optical constants of a thin film on a transparent substrate remains a problem requiring urgent resolution.

SUMMARY OF THE INVENTION

In order to solve the above problem, the present invention proposes a device and method capable of accurately measuring a thin film on a transparent substrate through eliminating interfering light reflected from the transparent substrate.

To this end, the proposed device includes, disposed sequentially along a direction of light propagation, a light source, a collimator lens, a filter, a polarizer, a beam splitter and an objective lens, the beam splitter being in connection with a planar array detector and a processor, an illumination light emitted by the light source sequentially passing through the collimator lens, the filter, the polarizer, the beam splitter and the objective lens and thereby forming a measuring light incident on the thin film on the transparent substrate, the objective lens and the beam splitter gathering light reflected from the thin film on the transparent substrate, the planar array detector and the processor measuring physical parameters of the thin film on the transparent substrate based on the gathered reflected light, wherein the measurement device further comprises a stop configured to block interfering light reflected from the transparent substrate during the measurement.

Optionally, the stop may be disposed in a back focal plane of the objective lens. The stop may have a diameter L1 calculated as:

$$L1 = \frac{\text{NA\_interferece}}{\text{NA\_objective}} \times L2,$$

where NA_interferece=n×sin $\theta_1$, $$\theta_1 = \arctan\left(\frac{L3 + L4}{4h}\right),$$

NA_interferece represents a maximum numerical aperture of interfered light reflected from the thin film, NA_objective denotes a maximum numerical aperture of the objective lens, L2 is a diameter of the back focal plane of the objective lens, n is a refractive index of the transparent substrate, h is a thickness of the transparent substrate, $\theta_1$ is an angle of refraction of the measuring light within the transparent substrate, L3 is a diameter of a maximum field of view of the objective lens, and L4 is a diameter of a field of illumination of the light source during the measurement.

Preferably, the stop may be an adjustable stop including a plurality of sub-stops.

Preferably, the light source may be a halogen lamp or a xenon lamp.

Preferably, the filter may be a narrow-band filter.

Preferably, the polarizer may be a polarizing plate or a polarizing prism.

Preferably, the beam splitter may be a right-angle splitting prism or a half-silvered mirror.

Preferably, the planar array detector may be a charge-coupled device detector or a complementary metal-oxide-semiconductor detector.

The present invention also provides a method for measuring physical parameters of a thin film on a transparent substrate, including the steps of:

1) provision of a measurement device for measuring the thin film on the transparent substrate, the measurement device including, disposed sequentially along a direction of light propagation, a light source, a collimator lens, a filter, a polarizer, a beam splitter, an objective lens and a stop, wherein the stop is disposed in a back focal plane of the objective lens;

2) provision by the light source of an illumination light that passes sequentially through the collimator lens, the filter and the polarizer and is reflected by the beam splitter, wherein a planar array detector and a processor is connected to the beam splitter;

3) passage of the reflected light resulting from step 2) through the objective lens to form a measuring light and incidence of the measuring light on the thin film on the transparent substrate;

4) convergence of light reflected from the thin film on the transparent substrate on the back focal plane of the objective lens, blockage by the stop of interfering light reflected from the transparent substrate, and reflection by the beam splitter of unblocked reflected light onto the planar array detector which thereby forms an image and feeds signals of the image to the processor; and 5) measurement by the processor of the physical parameters of the thin film by processing the signals of the image fed back from the planar array detector.

Preferably, the measurement of the physical parameters of the thin film may be accomplished by filtering out angular spectrum signals in light scattered from the thin film that are interfered with by the light reflected from the transparent substrate based on a thickness of the transparent substrate, a diameter of a field of view of the objective lens, a diameter of a field of illumination of the light source during the measurement and a diameter of the stop.

Preferably, the diameter of the stop may be indicated at L1 and calculated as:

$$L1 = \frac{NA\_interferece}{NA\_objective} \times L2,$$

where NA_interferece=n×sin $\theta_1$, $$\theta_1 = \arctan\left(\frac{L3 + L4}{4h}\right),$$

NA_interferece represents a maximum numerical aperture of interfered light reflected from the thin film, NA_objective denotes a maximum numerical aperture of the objective lens, L2 is a diameter of the back focal plane of the objective lens, n is a refractive index of the transparent substrate, h is the thickness of the transparent substrate, $\theta_1$ is an angle of refraction of the measuring light within the transparent substrate, L3 is a diameter of a maximum field of view of the objective lens, and L4 is a diameter of the field of illumination of the light source during the measurement.

The present invention also provides another method for measuring physical parameters of a thin film on a transparent substrate, including the steps of:

1) provision of a measurement device for measuring the thin film on the transparent substrate, the measurement device including, disposed sequentially along a direction of light propagation, a light source, a stop, a collimator lens, a filter, a polarizer, a beam splitter and an objective lens, wherein the stop is disposed at a conjugate of a pupil plane of an illumination optical path of the light source;

2) provision by the light source of an illumination light in which components with small angles of incidence are blocked by the stop and components with large angles of incidence pass therethrough, resulting in annular illumination light that passes sequentially through the collimator lens, the filter and the polarizer and is reflected by the beam splitter, wherein a planar array detector and a processor is connected to the beam splitter;

3) passage of the reflected light resulting from step 2) through the objective lens to form a measuring light and incidence of the measuring light on the thin film on the transparent substrate, which avoids focusing of interfering light signals resulting from the reflection of components of the illumination light that are incident at small angles;

4) passage of light reflected by the thin film on the transparent substrate at a same angle through the objective lens and reflection thereof by the beam splitter onto the planar array detector which thereby forms an image and feeds signals of the image to the processor; and 5) measurement by the processor of the physical parameters of the thin film by processing the signals of the image fed back from the planar array detector.

Preferably, the measurement of the physical parameters of the thin film may be accomplished by filtering out angular spectrum signals in light scattered from the thin film that are interfered with by the light reflected from the transparent substrate based on a thickness of the transparent substrate, a diameter of a field of view of the objective lens, a diameter of a field of illumination of the light source during the measurement and a diameter of the stop.

Preferably, the diameter of the stop may be indicated at L1 and calculated as:

$$L1 = k\frac{NA\_interferece}{NA\_objective} \times L2,$$

where NA_interferece=n×sin $\theta_1$, $$\theta_1 = \arctan\left(\frac{L3 + L4}{4h}\right),$$

NA_interferece represents a maximum numerical aperture of interfered light reflected from the thin film, NA_objective denotes a maximum numerical aperture of the objective lens, L2 is a diameter of the back focal plane of the objective lens, n is a refractive index of the transparent substrate, h is the thickness of the transparent substrate, $\theta_1$ is an angle of refraction of the measuring light within the transparent substrate, L3 is a diameter of a maximum field of view of the objective lens, L4 is a diameter of the field of illumination of the light source during the measurement, and k is a magnification coefficient.

Preferably, the stop may be an adjustable stop.

Compared with the prior art, the invention has the advantages that a portion of reflected light that results from light incident at small angles and is therefore interfered with by light reflected from the transparent substrate is blocked by a stop of a proper diameter calculated according to an equation based on the thickness of the transparent substrate, the size of the objective lens, the size of the field of illumination, with the remainder of the reflected light forming an image that is sent to the data processor for the calculation of a thickness and relevant optical data of the thin film. Therefore, the device of the present invention allows design of different stops for different thin films, simple operation and accurate measurement.

In FIG. 1, 80 denotes incident light; 81, light reflected from the substrate; 82, the transparent substrate; 83, the transparent thin film; 84, light reflected from the transparent thin film; 85, an objective lens; and 86, a back focal plane of an objective lens.

In FIGS. 2 to 6, 1 denotes a light source; 2, a collimator lens; 3, a filter; 4, a polarizer; 5, a beam splitter; 6, a first stop; 7, an objective lens; 8, an object to be measured; 9, a stage for carrying the object; 10a, incident light; 10b, reflected light; 11, a planar array detector; 12, a back focal plane of the objective lens; 13, a processor; 14, a conjugate of a pupil plane of an illumination optical path; 15, a second stop; 16, a third stop; 91, a thin film to be measured; 92, a field of view of the objective lens in a measurement system; 93, a field of illumination of an optical system; 94, a substrate; 95, light resulting from the reflection by the substrate of light incident thereon at a certain angle; 96, the back focal plane of the objective lens; 97, the objective lens; and $\theta_1$, an angle of refraction.

DETAILED DESCRIPTION

Specific embodiments of the present invention will be described below in detail with reference to the accompanying drawings so that the above objects, features and advantages of the invention will be more apparent.

Embodiment 1

Figure 2:
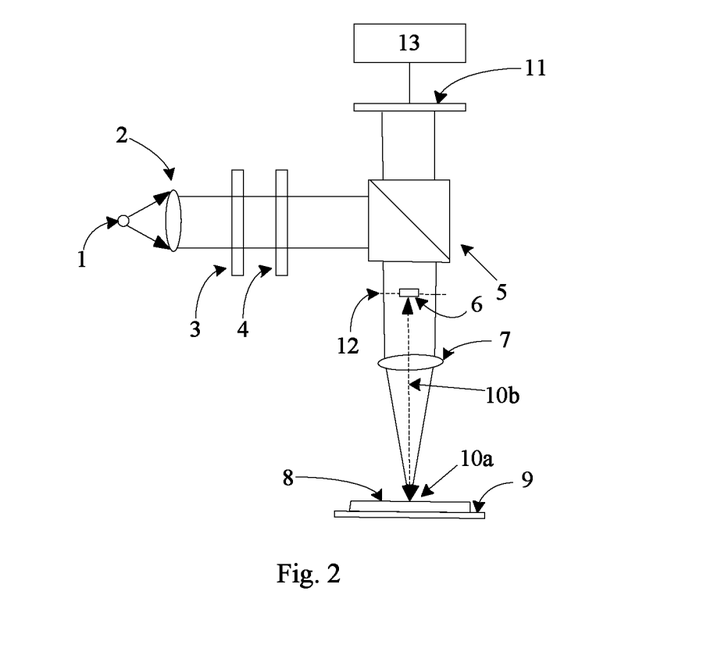
FIG. 2 is a structural schematic of a device according to a first embodiment of the present invention.

FIG. 2 shows a device for measuring a thin film on a transparent substrate in accordance with the present invention, which includes, disposed sequentially along the direction of light propagation, a light source 1, a collimator lens 2, a filter 3, a polarizer 4, a beam splitter 5 and an objective lens 7. An object 8 to be measured, i.e., the thin film on the transparent substrate, is placed on a stage 9. To the beam splitter 5 are sequentially connected a planar array detector 11 and a processor 13. The device further includes a first stop 6 for blocking interfering light reflected from the transparent substrate during the measurement.

Figure 3:
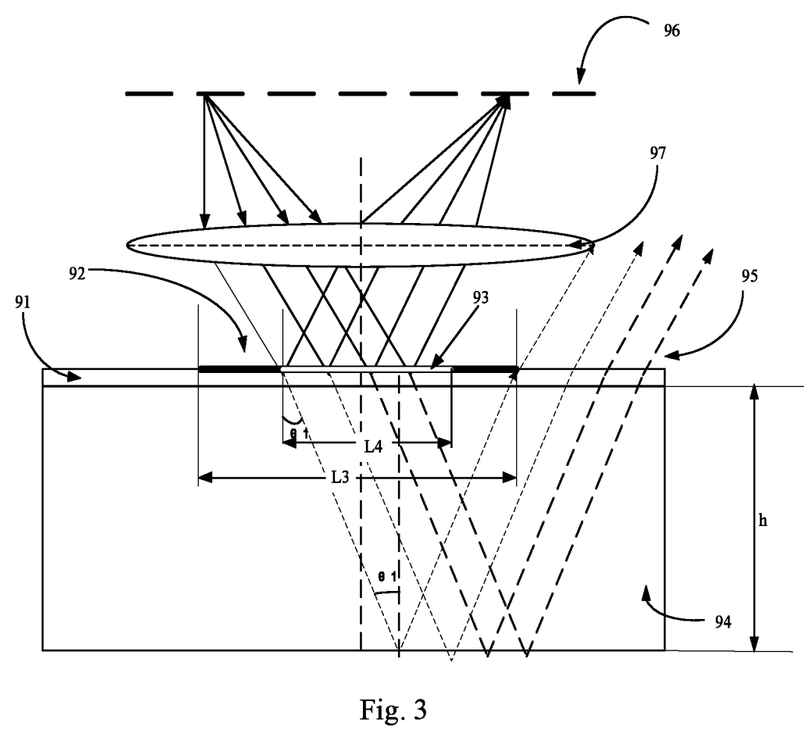
FIG. 3 shows the principles of the present invention.

Preferably, in FIG. 3: h indicates a thickness of the substrate 94; n a refractive index of the substrate 94; L4 a diameter of a field of illumination 93 of the optical system; L3, a diameter of a maximum field of view 92 of the objective lens in the measurement system; and L2, a diameter of a back focal plane 96 of the objective lens. As can be seen from the figure, an angle of refraction $\theta_1$ can be expressed as:

$$\theta_1 = \arctan\left(\frac{L3 + L4}{4h}\right).$$

A maximum numerical aperture receivable by the objective lens 97 is given by:

$$\text{NA\_interferece} = n \times \sin\theta_1 = n \times \sin\left[\arctan\left(\frac{L3 + L4}{4h}\right)\right]$$

A diameter L1 of the first stop 6 can hence be calculated as:

$$L1 = \frac{\text{NA\_interferece}}{\text{NA\_objective}} \times L2,$$

wherein NA_interference represents a maximum numerical aperture for interfered light reflected from the transparent thin film, i.e., the maximum numerical aperture for reception by the objective lens 97, and NA_objective is a maximum numerical aperture that can be received by the objective lens 97. Therefore, in practical use, the first stop 6 may be sized based on the thickness of the substrate 94, the diameter L4 of the field of illumination 93 of the optical system and other data. Additionally, the size of the first stop 6 can be modified by tuning the light source 1.

Here, the interfered light reflected from the transparent thin film refers to light containing both light reflected from the thin film and light reflected from the transparent substrate.

Preferably, the light source 1 is a halogen lamp or xenon lamp.

Preferably, the filter 3 is a narrow-band filter allowing the passage of light of a wavelength of, for example, 780 nm, 633 nm, 550 nm, 441 nm or 360 nm.

Preferably, the polarizer 4 is a polarizing plate or a polarizing prism.

Preferably, the beam splitter 5 is a right-angle splitting prism or a half-silvered mirror.

Preferably, the planar array detector 11 is a charge-coupled device (CCD) detector or a complementary metal-oxide-semiconductor (CMOS) detector, which responds well to the light exiting the filter 3.

Preferably, the first stop 6 is disposed in the back focal plane 12 of the objective lens.

The present invention also provides a method for measuring a thin film on a transparent substrate using the device as defined above. The method includes the following steps.

In step 1, the object 8 to be measured, i.e., the thin film on the transparent substrate, that is placed on the stage 9 is provided.

In step 2, the light source 1 provides illumination light which then passes sequentially through the collimator lens 2, the filter 3 and the polarizer 4 and is reflected by the beam splitter 5.

In step 3, the reflected light resulting from step 2 passes through the objective lens 7 and is incident on the object 8 (referred hereinafter as the incident light and indicated at 10a). The objective lens 7 has a great numerical aperture, and the incident light is converged onto the object 8 at a certain angle of convergence to form a small illumination light spot.

In step 4, light 10b reflected from the object 8 at the same angle is converged on the back focal plane 12 of the objective lens 7, with interfering scattered light from the transparent substrate being blocked by the first stop 6, so that only the light reflected from the film is reflected by the beam splitter 5 onto the planar array detector 11. The detector forms an image of the object and feeds data of the image to the processor 13.

As shown in FIG. 1, a light beam 80 incident upon the film on the transparent substrate is reflected by the film to form multiple reflected light beams 84 and is reflected by the transparent substrate to form a reflected light beam 81 that travels at the same angle as the reflected light beams 84. The term "light reflected at the same angle" used in the above description of step 4 refers to these reflected light beams 84 and 81 travelling at the same angle.

Size of the first stop 6 may be determined based on the thickness of the substrate 94 and the diameter L4 of the field of illumination 93 of the optical system according to the following equation:

$$L1 = \frac{NA\_interferece}{NA\_objective} \times L2,$$

where $NA\_interferece = n \times \sin\theta_1$, $$\theta_1 = \arctan\left(\frac{L3 + L4}{4h}\right),$$

L1 denotes the size of the first stop 6, h is the thickness of the substrate 94, n is the refractive index of the substrate 94, L4 is the diameter of the field of illumination 93 of the optical system, L3 is the diameter of the maximum field of view 92 of the objective lens in the measurement system, and L2 is the diameter of the back focal plane 96 of the objective lens.

In step 5, the processor 13 processes image signals from the planar array detector 11, and the processor 13 compares angular spectrum signals of the remaining reflected light with simulation data so as to reversely deduct physical parameters of the thin film of the object 8. In this embodiment, the physical parameters include information about the thickness and/or optical constants of the thin film.

Embodiment 2

Figure 4:
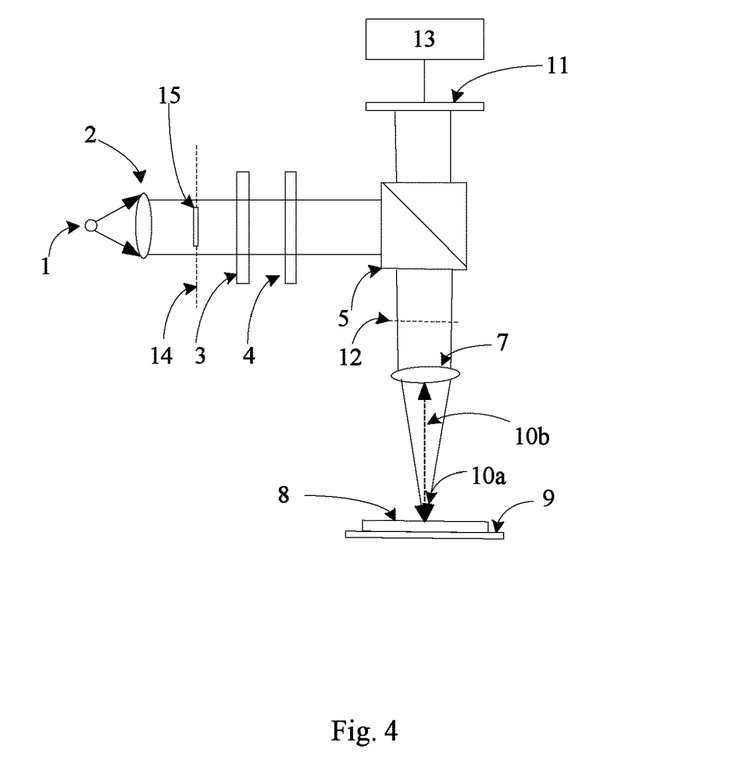
FIG. 4 is a structural schematic of a device according to a second embodiment of the present invention.

As shown in FIG. 4, this embodiment differs from Embodiment 1 in that the first stop 6 placed in the back focal plane of the objective lens 7 is removed and that a second stop 15 is instead positioned at a conjugate 14 of a pupil plane of the illumination optical path. The second stop 15 has a diameter of k1×L1, where k1 represents a magnification coefficient, in particular, between the pupil plane of the objective lens and the stop 15, and L1 is calculated in the same way as Embodiment 1 and is therefore not again described for the sake of brevity. The second stop 15 allows annular illumination by removing light incident at smaller angles. As a result, light signals collected by the objective lens 7 are all from the object 8 and not interfered with by light from the transparent substrate. In addition, the annular illumination also facilitates the control of stray light in the optical path and thus achieves a higher signal to noise ratio.

Here, the smaller angles refer to those at which light is incident on the surface of the thin film, for example, light 80 of FIG. 1. Due to inherent characteristics of the optical system, if the light 80 is incident at a smaller angle, reflected light 84 from the thin film and reflected light 81 from the transparent substrate will be both collected by the objective lens (this is not desired for the present invention, and only the reflected light 84 from the thin film is needed). Therefore, it is necessary to remove light incident at such angles. In a practical optical system, each angle at which light is incident on the thin film corresponds to a respective position in the pupil plane of the objective lens. Thus, removal of light incident at smaller angles within a certain range can be accomplished by shielding a corresponding area of the pupil plane of the objective lens. The specific area to be shielded can be derived from the equation given above.

Embodiment 3

Figure 5:
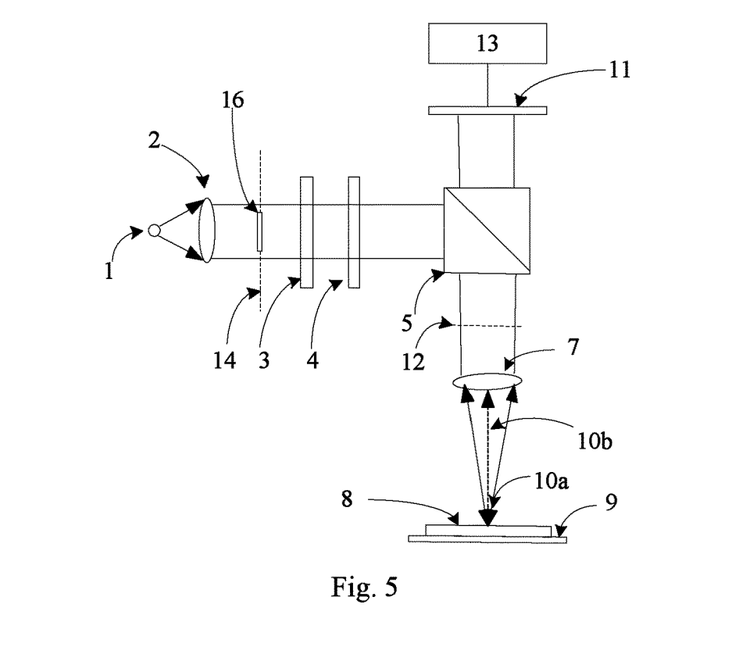
FIG. 5 is a structural schematic of a device according to a third embodiment of the present invention.
Figure 6:
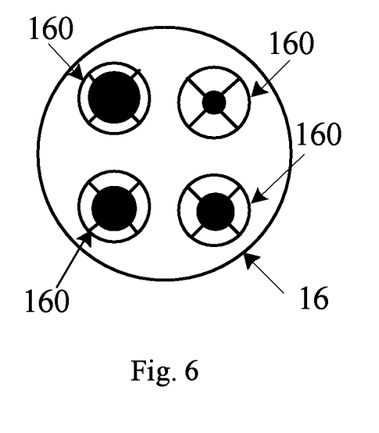
FIG. 6 is a plan view of a stop according to the third embodiment of the present invention.

As shown in FIG. 5, this embodiment differs from Embodiment 1 in that the first stop 6 placed in the back focal plane of the objective lens 7 is removed and that a third stop 16 is instead positioned at a conjugate 14 of a pupil plane of the collimator lens 2. The third stop 16 is adjustable and has a diameter of k2×L1, where k2 represents a magnification coefficient. In this embodiment, the third stop 16 is composed of a series of differently sized sub-stops 160 (the sizes are selected according to the needs of practical tests). k2 may be the same as k1 in Embodiment 2, i.e., a magnification coefficient between the pupil plane of the objective lens and the stop 16. L1 is calculated in the same way as Embodiment 1 and is therefore not again described for the sake of brevity of disclosure. As such, in practical operation, a proper sub-stop can be selected, or a light-blocking portion thereof can be configured, according to the testing arrangement. Referring to FIG. 6, each sub-stop in third stop 16 has a light-blocking portion, shown as a black area in the figure, and a light-transmitting portion, shown as a white area in the figure. Selecting a proper one of the sub-stops by rotating the third stop 16 or properly adjusting the light-blocking portion of the selected sub-stop can result in an annular illumination pattern of the light source 1 that can meet the practical need. In such a manner, light incident at small angles can be directly precluded according to the practical operating conditions, so that the object 8 is measured based on signals collected by the objective lens 7 that are not interfered with by light reflected from the transparent substrate underlying the object 8.

Here, the smaller angles refer to those at which light is incident on the surface of the thin film, for example, light 80 of FIG. 1. Due to inherent characteristics of the optical system, if the light 80 is incident at a smaller angle, reflected light 84 from the thin film and reflected light 81 from the transparent substrate will be both collected by the objective lens (this is not desired for the present invention, and only the reflected light 84 from the thin film is needed). Therefore, it is necessary to remove light incident at such angles. In a practical optical system, each angle at which light is incident on the thin film corresponds to a respective position in the pupil plane of the objective lens. Thus, removal of light incident at smaller angles within a certain range can be accomplished by shielding a corresponding area of the pupil plane of the objective lens. The specific area to be shielded can be derived from the equation given above.

It is apparent that those skilled in the art can make various modifications and variations to the present invention without departing from the spirit and scope thereof. Accordingly, it is intended that all such modifications and variations are embraced in the scope of the invention if they fall within the scope of the appended claims and their equivalents.

What is claimed is:

1. A measurement device for measuring a thin film on a transparent substrate, comprising, disposed sequentially along a direction of light propagation:
   a light source,
   a collimator lens,
   a filter,
   a polarizer,
   a beam splitter, in connection with a planar array detector and a processor, and
   an objective lens,
   wherein an illumination light emitted by the light source sequentially passes through the collimator lens, the filter, the polarizer, the beam splitter and the objective lens and thereby forming a measuring light incident on the thin film on the transparent substrate, the objective lens and the beam splitter gathering light reflected from the thin film on the transparent substrate, the planar array detector and the processor measuring physical parameters of the thin film on the transparent substrate based on the gathered reflected light,
   wherein the measurement device further comprises a stop configured to block interfering light reflected from the transparent substrate during the measurement,
   wherein a diameter of the stop is determined based on a thickness of the transparent substrate, a diameter of a maximum field of view of the objective lens and a diameter of a field of illumination of the light source during the measurement.

2. The measurement device according to claim 1, wherein the stop is disposed in a back focal plane of the objective lens.

3. The measurement device according to claim 2, wherein the stop has a diameter L1 calculated as:

$$L1 = \frac{NA\_interferece}{NA\_objective} \times L2,$$

where $NA\_interferece = n \times \sin \theta_1$, $$\theta_1 = \arctan\left(\frac{L3 + L4}{4h}\right),$$

NA_interferece represents a maximum numerical aperture of interfered light reflected from the thin film, NA_objective denotes a maximum numerical aperture of the objective lens, L2 is a diameter of the back focal plane of the objective lens, n is a refractive index of the transparent substrate, h is a thickness of the transparent substrate, $\theta_1$ is an angle of refraction of the measuring light within the transparent substrate, L3 is a diameter of a maximum field of view of the objective lens, and L4 is a diameter of a field of illumination of the light source during the measurement.

4. The measurement device according to claim 1, wherein the stop is disposed at a conjugate of a pupil plane of an illumination optical path of the light source such that the light source provides an annular illumination.

5. The measurement device according to claim 1, wherein the stop is disposed at a conjugate of a pupil plane of the collimator lens such that the light source provides an annular illumination.

6. The measurement device according to claim 1, wherein the stop has a diameter L1 calculated as:

$$L1 = k\frac{NA\_interferece}{NA\_objective} \times L2,$$

where $NA\_interferece = n \times \sin \theta_1$, $$\theta_1 = \arctan\left(\frac{L3 + L4}{4h}\right),$$

NA_interferece represents a maximum numerical aperture of interfered light reflected from the thin film, NA_objective denotes a maximum numerical aperture of the objective lens, L2 is a diameter of a back focal plane of the objective lens, n is a refractive index of the transparent substrate, h is a thickness of the transparent substrate, $\theta_1$ is an angle of refraction of the measuring light within the transparent substrate, L3 is a diameter of a maximum field of view of the objective lens, L4 is a diameter of a field of illumination of the light source during the measurement, and k is a magnification coefficient.

7. The measurement device according to claim 1, wherein the stop is an adjustable stop comprising a plurality of sub-stops.

8. The measurement device according to claim 1, wherein the light source is a halogen lamp or a xenon lamp.

9. The measurement device according to claim 1, wherein the filter is a narrow-band filter.

10. The measurement device according to claim 1, wherein the polarizer is a polarizing plate or a polarizing prism.

11. The measurement device according to claim 1, wherein the beam splitter is a right-angle splitting prism or a half-silvered mirror.

12. The measurement device according to claim 1, wherein the planar array detector is a charge-coupled device detector or a complementary metal-oxide-semiconductor detector.

13. A measurement method for measuring physical parameters of a thin film on a transparent substrate, comprising the steps of:
   1) provision of a measurement device for measuring the thin film on the transparent substrate, the measurement device comprising, disposed sequentially along a direction of light propagation, a light source, a collimator lens, a filter, a polarizer, a beam splitter, an objective lens and a stop, wherein the stop is disposed in a back focal plane of the objective lens;
   2) provision by the light source of an illumination light that passes sequentially through the collimator lens, the filter and the polarizer and is reflected by the beam splitter, wherein a planar array detector and a processor is connected to the beam splitter;

3) passage of the reflected light resulting from step 2) through the objective lens to form a measuring light and incidence of the measuring light on the thin film on the transparent substrate;

4) convergence of light reflected from the thin film on the transparent substrate on the back focal plane of the objective lens, blockage by the stop of interfering light reflected from the transparent substrate, and reflection by the beam splitter of unblocked reflected light onto the planar array detector which thereby forms an image and feeds signals of the image to the processor; and 5) measurement by the processor of the physical parameters of the thin film by processing the signals of the image fed back from the planar array detector, wherein a diameter of the stop is determined based on a thickness of the transparent substrate, a diameter of a maximum field of view of the objective lens and a diameter of a field of illumination of the light source during the measurement, thereby the measurement of the physical parameters of the thin film is accomplished by filtering out angular spectrum signals in light scattered from the thin film that are interfered with by the light reflected from the transparent substrate.

14. The measurement method according to claim 13, wherein the diameter of the stop is indicated at L1 and calculated as:

$$L1 = \frac{NA\_interferece}{NA\_objective} \times L2,$$

where $NA\_interferece = n \times \sin \theta_1$, $$\theta_1 = \arctan\left(\frac{L3 + L4}{4h}\right),$$

NA_interferece represents a maximum numerical aperture of interfered light reflected from the thin film, NA_objective denotes a maximum numerical aperture of the objective lens, L2 is a diameter of the back focal plane of the objective lens, n is a refractive index of the transparent substrate, h is the thickness of the transparent substrate, $\theta_1$ is an angle of refraction of the measuring light within the transparent substrate, L3 is a diameter of a maximum field of view of the objective lens, and L4 is a diameter of the field of illumination of the light source during the measurement.

15. A measurement method for measuring physical parameters of a thin film on a transparent substrate, comprising the steps of:

1) provision of a measurement device for measuring the thin film on the transparent substrate, the measurement device comprising, disposed sequentially along a direction of light propagation, a light source, a stop, a collimator lens, a filter, a polarizer, a beam splitter and an objective lens, wherein the stop is disposed at a conjugate of a pupil plane of an illumination optical path of the light source;

2) provision by the light source of an illumination light in which components with small angles of incidence are blocked by the stop and components with large angles of incidence pass therethrough, resulting in annular illumination light that passes sequentially through the collimator lens, the filter and the polarizer and is reflected by the beam splitter, wherein a planar array detector and a processor is connected to the beam splitter;

3) passage of the reflected light resulting from step 2) through the objective lens to form a measuring light and incidence of the measuring light on the thin film on the transparent substrate, which avoids focusing of interfering light signals resulting from reflection of components of the illumination light that are incident at small angles;

4) passage of light reflected by the thin film on the transparent substrate at a same angle through the objective lens and reflection thereof by the beam splitter onto the planar array detector which thereby forms an image and feeds signals of the image to the processor; and 5) measurement by the processor of the physical parameters of the thin film by processing the signals of the image fed back from the planar array detector, wherein a diameter of the stop is determined based on a thickness of the transparent substrate, a diameter of a maximum field of view of the objective lens and a diameter of a field of illumination of the light source during the measurement, thereby the measurement of the physical parameters of the thin film is accomplished by filtering out angular spectrum signals in light scattered from the thin film that are interfered with by the light reflected from the transparent substrate.

16. The measurement method according to claim 15, wherein the diameter of the stop is indicated at L1 and calculated as:

$$\theta_1 = \arctan\left(\frac{L3 + L4}{4h}\right),$$

where $NA\_interferece = n \times \sin \theta_1$, $$L1 = k \frac{NA\_interferece}{NA\_objective} \times L2,$$

NA_interferece represents a maximum numerical aperture of interfered light reflected from the thin film, NA_objective denotes a maximum numerical aperture of the objective lens, L2 is a diameter of the back focal plane of the objective lens, n is a refractive index of the transparent substrate, h is the thickness of the transparent substrate, $\theta_1$ is an angle of refraction of the measuring light within the transparent substrate, L3 is a diameter of a maximum field of view of the objective lens, L4 is a diameter of the field of illumination of the light source during the measurement, and k is a magnification coefficient.

17. The measurement method according to claim 15, wherein the stop is an adjustable stop.

* * * * *